(12) United States Patent
Taketa et al.

(10) Patent No.: US 12,158,080 B2
(45) Date of Patent: Dec. 3, 2024

(54) TURBINE VANE REPAIRING METHOD

(71) Applicant: MITSUBISHI HEAVY INDUSTRIES, LTD., Tokyo (JP)

(72) Inventors: Naoki Taketa, Tokyo (JP); Takuya Hiraoka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/432,737

(22) Filed: Feb. 5, 2024

(65) Prior Publication Data
US 2024/0271527 A1 Aug. 15, 2024

(30) Foreign Application Priority Data
Feb. 14, 2023 (JP) ................. 2023-020612

(51) Int. Cl.
*F01D 5/00* (2006.01)
*B23P 6/00* (2006.01)
*B23P 6/04* (2006.01)

(52) U.S. Cl.
CPC ............. *F01D 5/005* (2013.01); *B23P 6/007* (2013.01); *B23P 6/045* (2013.01); *F05D 2230/232* (2013.01); *F05D 2230/80* (2013.01); *Y10T 29/49318* (2015.01)

(58) Field of Classification Search
CPC .... B23P 6/007; B23P 6/045; F05D 2230/232; F05D 2230/80; F01D 5/005; Y10T 29/49318; Y10T 29/49728; Y10T 29/49737; Y10T 29/49742
See application file for complete search history.

(56) References Cited

U.S. PATENT DOCUMENTS

| | | | | |
|---|---|---|---|---|
| 4,128,929 A | * | 12/1978 | DeMusis | B23P 6/002 451/365 |
| 4,155,152 A | * | 5/1979 | Cretella | F01D 5/225 416/193 A |
| 4,291,448 A | * | 9/1981 | Cretella | F01D 5/005 29/527.4 |
| 2005/0173496 A1 | | 8/2005 | Sato et al. | |
| 2008/0189946 A1 | * | 8/2008 | Moor | B23P 6/007 29/889.1 |

(Continued)

FOREIGN PATENT DOCUMENTS

JP 2004-283852 10/2004

*Primary Examiner* — Jermie E Cozart
(74) *Attorney, Agent, or Firm* — Wenderoth, Lind & Ponack, L.L.P.

(57) ABSTRACT

In a turbine vane repairing method, a damaged spot removing step of removing a damaged spot in one shroud of two shrouds, a member disposing step of disposing a deformation curbing member which comes into contact with each of the two shrouds and curbs change in relative positions between the two shrouds, an overlay welding step of performing overlay welding with respect to a removed part from which the damaged spot is removed in the one shroud and filling the removed part after the damaged spot removing step and the member disposing step, a member detaching step of detaching the deformation curbing member from the turbine vane after the overlay welding step, and a finishing step of polishing at least a surface of a part subjected to the overlay welding in the one shroud are executed.

9 Claims, 8 Drawing Sheets

(56) References Cited

U.S. PATENT DOCUMENTS

| | | | |
|---|---|---|---|
| 2009/0031564 A1* | 2/2009 | Meier | B23K 20/021 29/888.021 |
| 2009/0260206 A1* | 10/2009 | Gosling | B23P 6/002 29/23.51 |
| 2011/0167635 A1* | 7/2011 | Milleville | B23P 6/002 29/889.1 |
| 2016/0076376 A1* | 3/2016 | Trickey | F01D 5/005 228/114 |

* cited by examiner

TURBINE VANE REPAIRING METHOD

BACKGROUND OF THE INVENTION

Field of the Invention

The present invention relates to a turbine vane repairing method.

Priority is claimed on Japanese Patent Application No. 2023-020612, filed Feb. 14, 2023, the content of which is incorporated herein by reference.

Description of Related Art

A gas turbine includes a turbine blade and a turbine vane which are exposed to high-temperature/high-pressure combustion gas. Both the blades may be damaged by heat or the like of combustion gas.

The following Patent Document 1 discloses a method for repairing this turbine blade by performing overlay welding with respect to a damaged part when a tip fin formed at a tip of the turbine blade is damaged.

Patent Document

[Patent Document 1] Japanese Unexamined Patent Application, First Publication No. 2004-283852

SUMMARY OF THE INVENTION

A turbine vane of a gas turbine has a blade body, an outer shroud provided at an end on one side in the blade body, and an inner shroud provided at an end on the other side in the blade body.

An object of the present disclosure is to provide a technology of repairing this turbine vane when one shroud of an outer shroud and an inner shroud is damaged in the turbine vane of a gas turbine.

A turbine vane repairing method as an aspect according to the invention for achieving the foregoing object is applied to the following turbine vane.

This turbine vane has a blade body which has a cross section forming a blade profile and extends in a blade height direction perpendicular to the cross section, an outer shroud being provided at an end of the blade body on one side in the blade height direction, and an inner shroud being provided at an end of the blade body on the other side in the blade height direction.

In this turbine vane repairing method, a damaged spot removing step of removing a damaged spot in one shroud of the outer shroud and the inner shroud, a member disposing step of disposing a deformation curbing member which comes into contact with the outer shroud and the inner shroud and curbs change in relative positions of the outer shroud and the inner shroud, an overlay welding step of performing overlay welding with respect to a removed part from which the damaged spot is removed in the one shroud and filling the removed part after the damaged spot removing step and the member disposing step, a member detaching step of detaching the deformation curbing member from the turbine vane after the overlay welding step, and a finishing step of polishing at least a surface of a part subjected to the overlay welding in the one shroud are executed.

In the present aspect, even when one shroud of the outer shroud and the inner shroud in the turbine vane is damaged, a damaged spot of this one shroud can be repaired.

When overlay welding is performed with respect to a removed part from which a damaged spot is removed, due to heat input to one shroud, for example, due to deformation of a connection part or the like between the one shroud and the blade body, there is a possibility of change in relative positions of two shrouds. In the present aspect, since the deformation curbing member is disposed before overlay welding, change in relative positions of two shrouds at the time of overlay welding can be curbed.

According to the aspect of the present disclosure, this turbine vane can be repaired when one shroud of an outer shroud and an inner shroud is damaged.

DETAILED DESCRIPTION OF THE INVENTION

Hereinafter, an embodiment of a turbine vane repairing method according to the present disclosure will be described with reference to the drawings.

Figure 1:
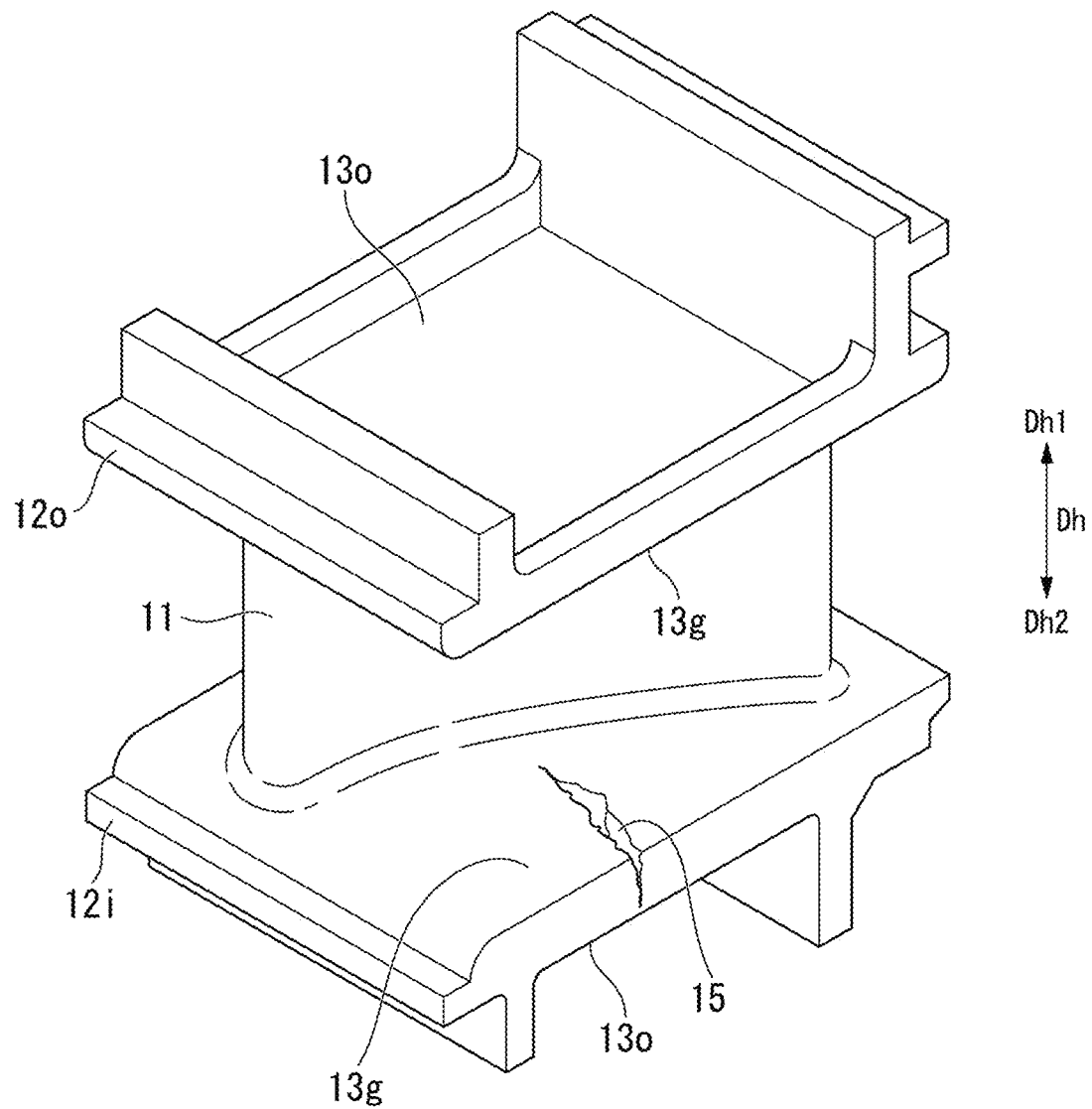
FIG. 1 is a perspective view of a turbine vane in an embodiment according to the present disclosure.

A gas turbine includes a turbine vane which is exposed to high-temperature/high-pressure combustion gas. As shown in FIG. 1, this turbine vane has a blade body 11, an outer shroud 12o, and an inner shroud 12i. The blade body 11 has a cross section forming a blade profile and extends in a blade height direction Dh perpendicular to this cross section. The outer shroud 12o is provided at an end of the blade body 11 on one side Dh1 in the blade height direction Dh. The inner shroud 12i is provided at an end of the blade body 11 on the other side Dh2 in the blade height direction Dh. Both the outer shroud 12o and the inner shroud 12i extend in a direction perpendicular to the blade height direction Dh from the blade body 11. Both the outer shroud 12o and the inner shroud 12i have a gas passing surface 13g facing a side where the blade body 11 is present in the blade height direction Dh, and a counter gas passing surface 13o having a back-to-back relationship with the gas passing surface 13g. While the gas turbine is driven, combustion gas flows between the gas passing surface 13g of the outer shroud 12o and the gas passing surface 13g of the inner shroud 12i. Thus, the gas passing surface 13g of the outer shroud 12o and the gas passing surface 13g of the inner shroud 12i form a surface defining a part of a combustion gas flow channel in the gas turbine.

A base material of this turbine vane is formed of a nickel-based alloy. In the turbine vane, surfaces of the base material may be subjected to thermal barrier coating.

Figure 2:
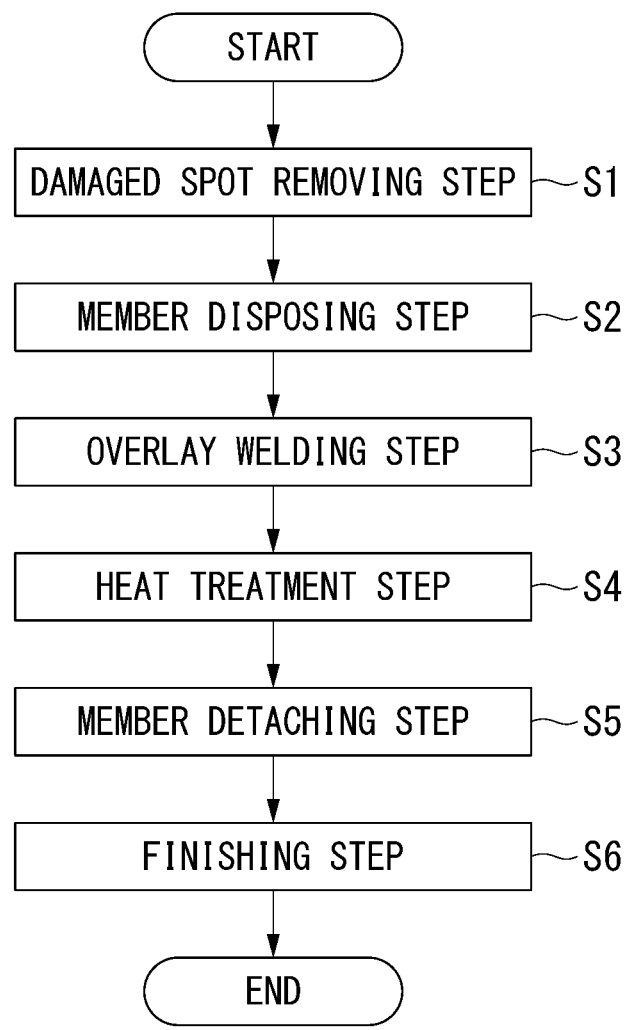
FIG. 2 is a flowchart showing an execution procedure of a turbine vane repairing method in the embodiment according to the present disclosure.

The foregoing turbine vane may be damaged due to heat or the like of combustion gas. Hence, hereinafter, the turbine vane repairing method will be described in accordance with the flowchart shown in FIG. 2. Here, in the outer shroud 12o and the inner shroud 12i, as shown in FIG. 2, it is assumed that a part of the inner shroud 12i is damaged and a damaged spot 15 is present in the inner shroud 12i.

Figure 3:
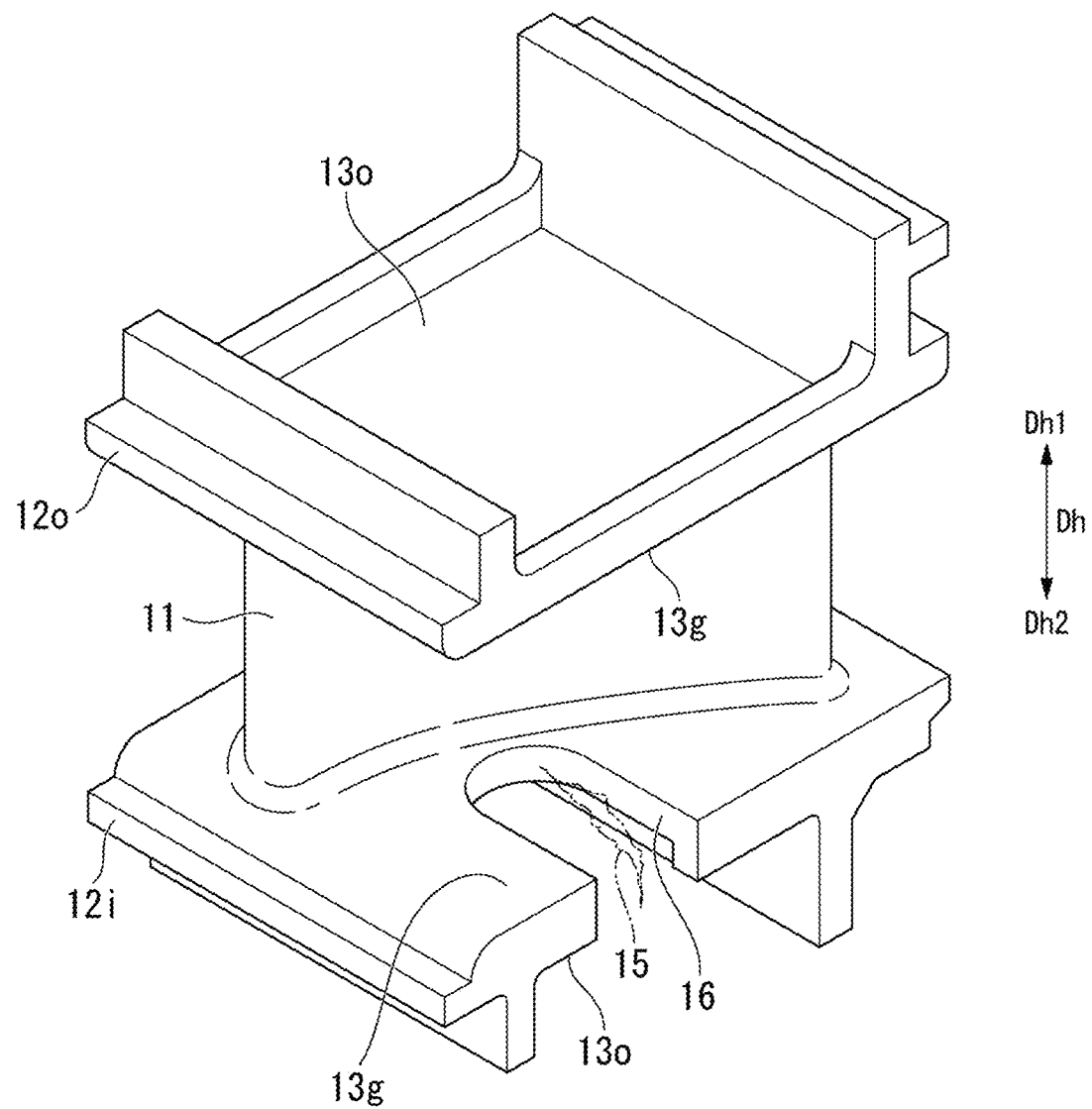
FIG. 3 is an explanatory view of a damaged spot removing step in the embodiment according to the present disclosure.

First, as shown in FIG. 3, the damaged spot 15 in the inner shroud 12i is removed using a grinder or the like (damaged spot removing step S1). By executing this damaged spot removing step S1, a removed part 16, from which the damaged spot 15 is removed, is formed in the inner shroud 12i. Here, it is assumed that the removed part 16 in the inner shroud 12i penetrates this inner shroud 12i from a part of the gas passing surface 13g of the inner shroud 12i to a part of the counter gas passing surface 13o of the inner shroud 12i.

Figure 4:
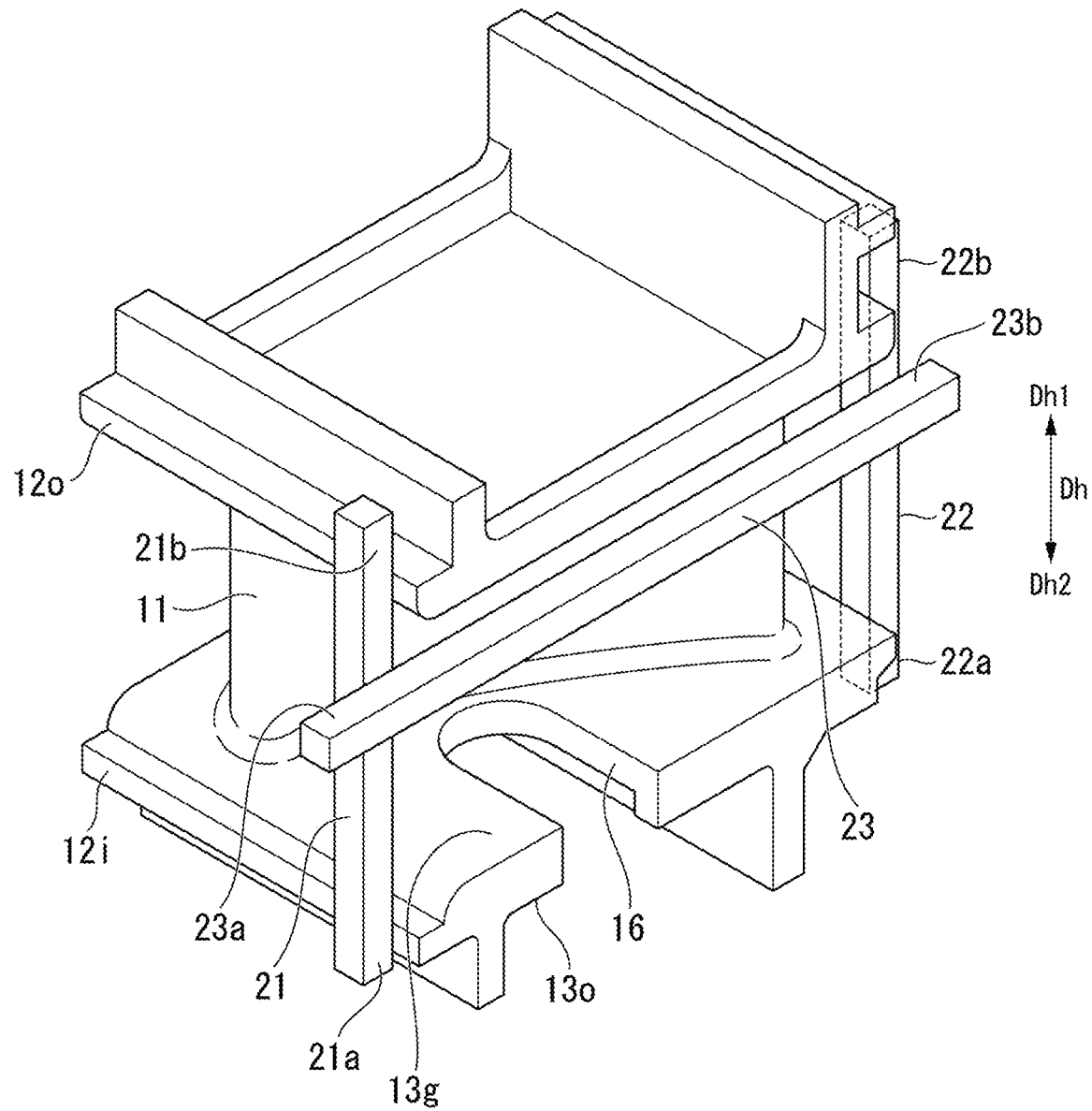
FIG. 4 is an explanatory view of a member disposing step in the embodiment according to the present disclosure.

Next, as shown in FIG. 4, a deformation curbing member 20 which curbs change in relative positions of the outer shroud 12o and the inner shroud 12i is disposed (member disposing step S2). Here, curbing change in relative positions of the outer shroud 12o and the inner shroud 12i includes not only curbing change in relative positions of one point in the outer shroud 12o and one point in the inner shroud 12i but also curbing an inclination of the inner shroud 12i with respect to the outer shroud 12o and torsion of the inner shroud 12i with respect to the outer shroud 12o.

The deformation curbing member 20 according to the present embodiment has a first strut 21 and a second strut 22 which respectively come into contact with the outer shroud 12o and the inner shroud 12i, and a beam 23 which couples the first strut 21 and the second strut 22. The first strut 21 has a first end 21a and a second end 21b. The second strut 22 also has a first end 22a and a second end 22b. In addition, the beam 23 also has a first end 23a and a second end 23b. All the first strut 21, the second strut 22, and the beam 23 are formed of the same nickel-based alloy as the base material of the turbine vane.

In the member disposing step S2, the first end 21a of the first strut 21 and the first end 22a of the second strut 22 are fixed to the inner shroud 12i, and the second end 21b of the first strut 21 and the second end 22b of the second strut 22 are fixed to the outer shroud 12o such that the first strut 21 and the second strut 22 extend in the blade height direction Dh and the removed part 16 in the inner shroud 12i is positioned between the first strut 21 and the second strut 22. Here, the first end 21a of the first strut 21 and the first end 22a of the second strut 22 are welding-joined to the inner shroud 12i. In addition, the second end 21b of the first strut 21 and the second end 22b of the second strut 22 are welding-joined to the outer shroud 12o.

In the member disposing step S2, the first end 23a of the beam 23 is fixed to the first strut 21, and the second end 23b of this beam 23 is fixed to the second strut 22 such that the beam 23 couples the first strut 21 and the second strut 22 and this beam 23 is positioned between the outer shroud 12o and the inner shroud 12i in the blade height direction Dh. Here, the first end 23a of the beam 23 is welding-joined to the first strut 21, and the second end 23b of this beam 23 is welding-joined to the second strut 22.

With this, the member disposing step S2 is completed.

Figure 5:
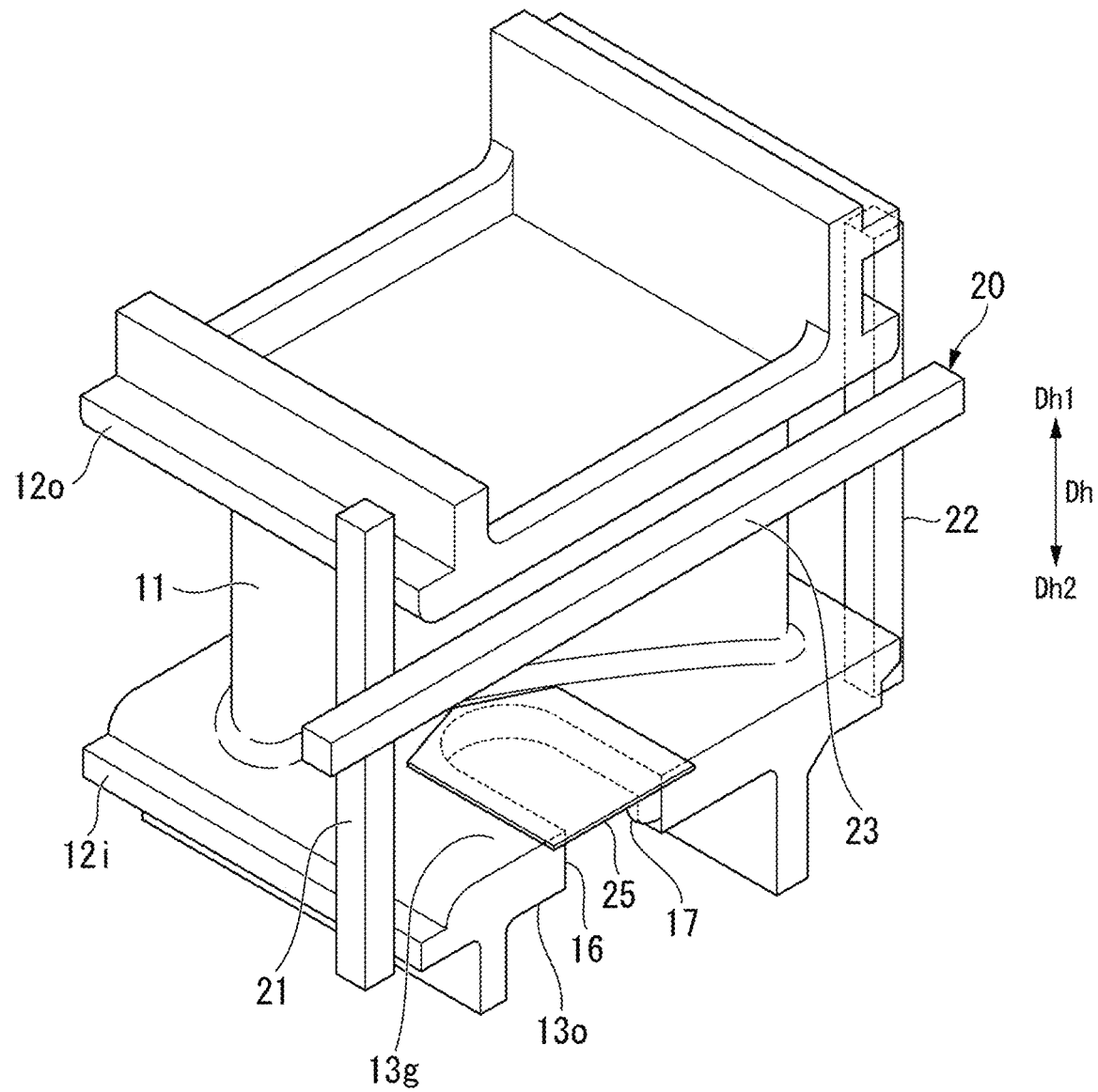
FIG. 5 is an explanatory view of an overlay welding step in the embodiment according to the present disclosure.
Figure 6:
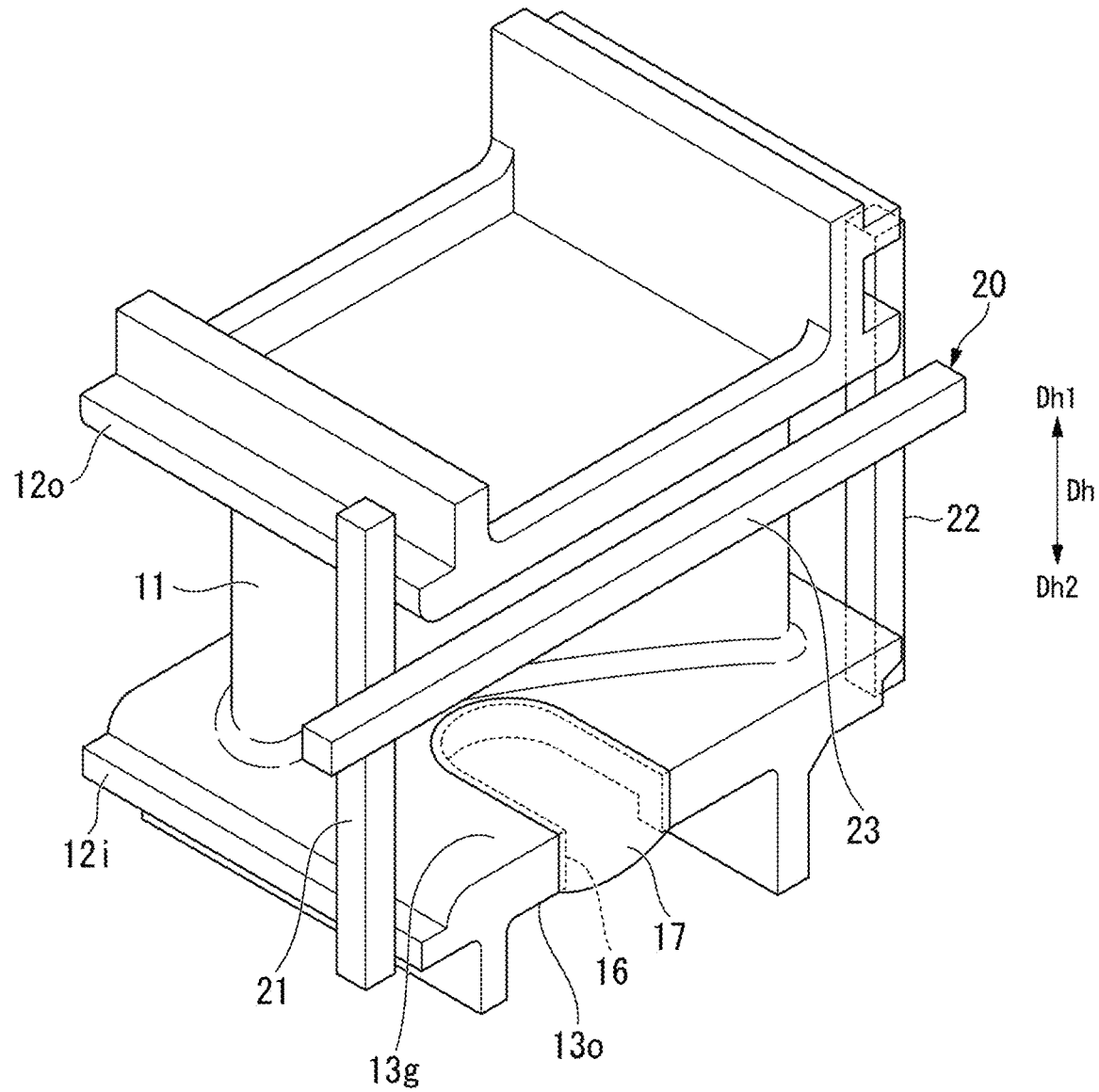
FIG. 6 is a perspective view of the turbine vane after the overlay welding step in the embodiment according to the present disclosure.

Next, the removed part 16 is filled by performing overlay welding with respect to the removed part 16 in the inner shroud 12i (overlay welding step S3). In this overlay welding step S3, first, as shown in FIG. 5, a patch plate 25 formed of copper or brass is brought into contact with the gas passing surface 13g of the inner shroud 12i, and the gas passing surface 13g side of the removed part 16 is blocked with this patch plate 25. At this time, the patch plate 25 is temporarily fixed to the inner shroud 12i by pinching the patch plate 25 and the inner shroud 12i using clamps or the like. Next, as shown in FIGS. 5 and 6, overlay welding is performed with respect to the removed part 16 from the side of the counter gas passing surface 13o of the inner shroud 12i. At this time, a nickel-based alloy welding material 17 of the same kind as a forming material of the base material of the turbine vane is used as a welding material for performing overlay welding with respect to the removed part 16.

As above, even when the removed part 16 penetrates the inner shroud 12i, overlay welding can be performed with respect to this removed part 16 by bringing the patch plate 25 into contact with the inner shroud 12i. In the present embodiment, a plate made of copper or brass is used as the patch plate 25. Since copper or brass has a higher heat conductivity than other metals, even if the welding material 17 in a molten state comes into contact with the patch plate 25 made of copper or brass, a large amount of heat dissipates from this welding material 17 so that joining between the patch plate 25 and the welding material 17 can be avoided. For this reason, in the present embodiment, the patch plate 25 can be easily removed after overlay welding.

When the removed part 16 does not penetrate the inner shroud 12i, there is no need to bring the patch plate 25 into contact with the inner shroud 12i. Generally, the damaged spot 15 grows from the gas passing surface 13g toward the counter gas passing surface 13o side. For this reason, when the removed part 16 does not penetrate the inner shroud 12i, the removed part 16 generally becomes a hole recessed from the gas passing surface 13g toward the counter gas passing surface 13o side. Thus, in this case, overlay welding is performed with respect to the removed part 16 from the side of the gas passing surface 13g.

If the overlay welding step S3 ends, heat treatment for reducing welding residual stress occurring due to overlay welding is performed with respect to the turbine vane after the overlay welding step S3 shown in FIG. 6 (heat treatment step S4). In this heat treatment step S4, for example, the turbine vane after the overlay welding step S3 is placed for several hours under a temperature environment of 1,000° C. or higher. In the present embodiment, through this heat treatment, welding residual stress occurring due to overlay welding can be reduced.

In the heat treatment step S4, the turbine vane and the deformation curbing member 20 thermally expand. In the present embodiment, since the base material of the turbine vane and the deformation curbing member 20 are formed of the same material, the amount of thermal expansion of the turbine vane and the amount of thermal expansion of the deformation curbing member 20 become the same. For this reason, in the present embodiment, in the heat treatment step S4, occurrence of stress due to the deformation curbing member 20 fixed to the turbine vane can be curbed.

Figure 7:
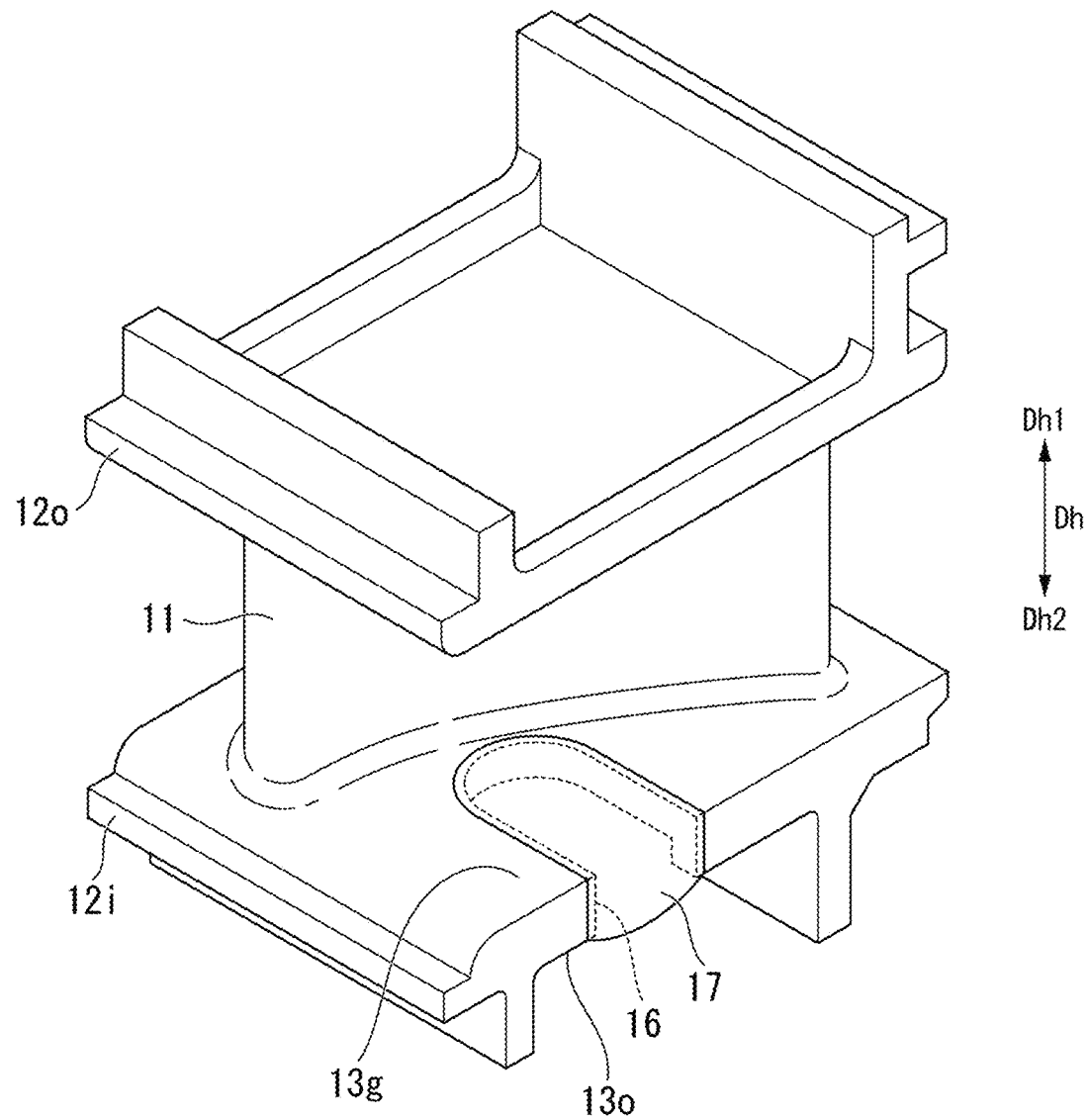
FIG. 7 is an explanatory view of a member detaching step in the embodiment according to the present disclosure.
Figure 8:
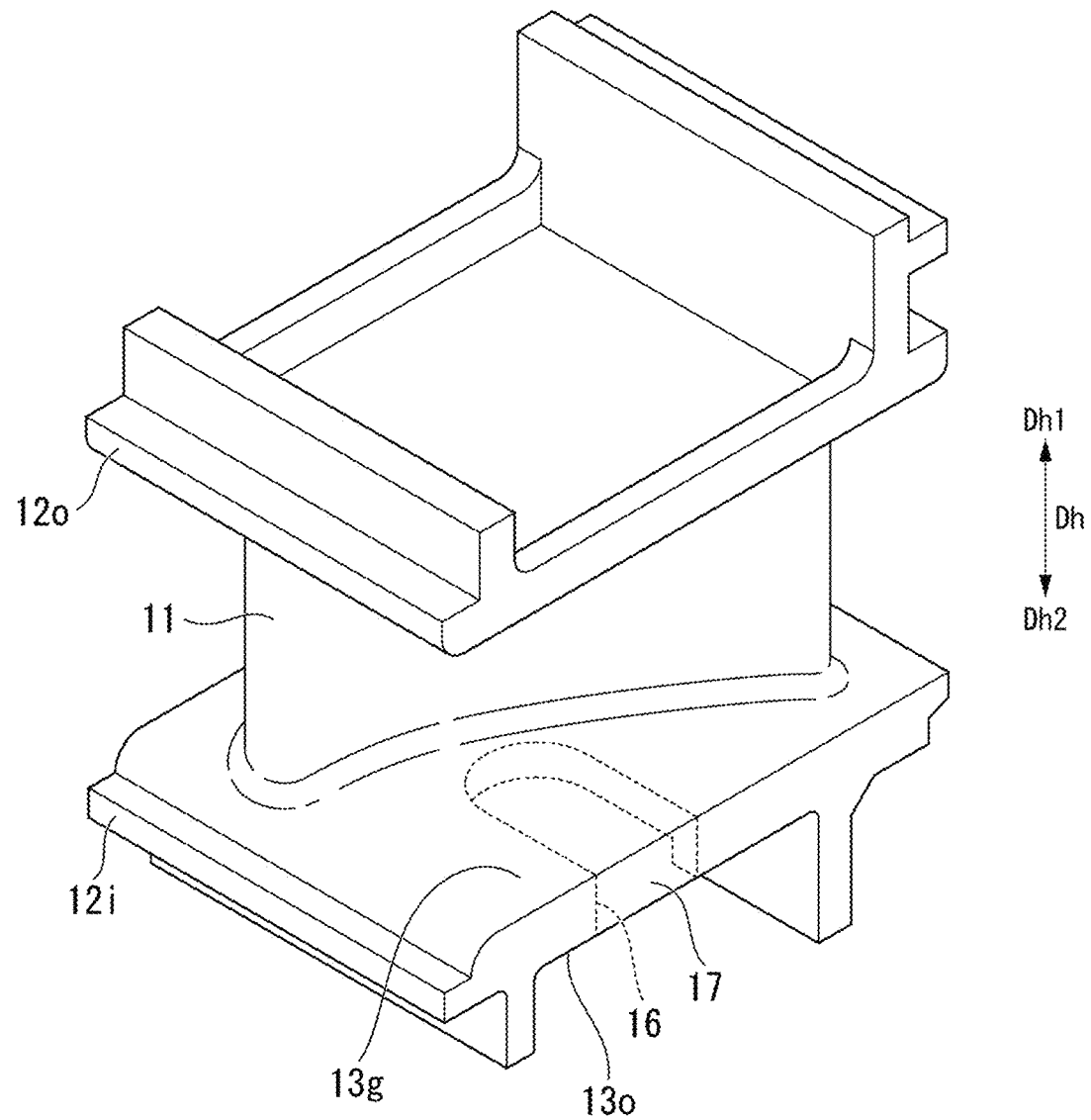
FIG. 8 is an explanatory view of the finishing step in the embodiment according to the present disclosure.

If the heat treatment step S4 ends, as shown in FIG. 7, the deformation curbing member 20 is detached from the turbine vane after the overlay welding step S3 and the heat treatment step S4 (member detaching step S5).

Next, the surfaces of turbine vane, from which the deformation curbing member 20 is detached, is finished (finishing step S6). In the inner shroud 12i after overlay welding, the welding material 17 used for performing overlay welding with respect to the removed part 16 rises from a surface part excluding the removed part 16 on the surface of the inner shroud 12*i*. Hence, in this finishing step S6, on the surface of the inner shroud 12*i*, at least the surface of a part subjected to overlay welding is polished. Further, the surface part excluding the removed part 16 on the surface of the inner shroud 12*i* and the surface of the part subjected to overlay welding are caused to be flush with each other. Moreover, in the finishing step S6, as necessary, on the surface of this turbine vane, the surface part including the gas passing surface 13*g* of the inner shroud 12*i* and the gas passing surface 13*g* of the outer shroud 12*o* is subjected to thermal barrier coating.

With this, repair of the turbine vane is completed. Hereinabove, a case in which the inner shroud 12*i* is damaged has been given as an example. However, even when the outer shroud 12*o* is damaged, this outer shroud 12*o* can be repaired by executing steps similar to those above. In this case, in the foregoing description, the inner shroud 12*i* is substituted with the outer shroud 12*o*, and the outer shroud 12*o* is substituted with the inner shroud 12*i*.

Hereinafter, in the present embodiment, even when one shroud 12*i* of the outer shroud 12*o* and the inner shroud 12*i* in the turbine vane is damaged, the damaged spot 15 of this one shroud 12*i* can be repaired.

When overlay welding is performed with respect to the removed part 16 from which the damaged spot 15 is removed, due to heat input to the one shroud 12*i*, for example, due to deformation of a connection part or the like between the one shroud 12*i* and the blade body 11, there is a possibility of change in relative positions of the two shrouds 12*i* and 12*o*. In the present embodiment, since the deformation curbing member 20 is disposed before overlay welding, change in relative positions of the two shrouds 12*i* and 12*o* at the time of overlay welding can be curbed. Particularly, in the present embodiment, since the deformation curbing member 20 has the two struts 21 and 22 and the beam 23 coupling the two struts 21 and 22, an inclination or torsion of the other shroud 12*o* with respect to the one shroud 12*i* can be curbed.

MODIFICATION EXAMPLE

The deformation curbing member 20 according to the present embodiment has the two struts 21 and 22 and the beam 23 coupling the two struts 21 and 22. However, the deformation curbing member 20 may have only one strut 21 or may have only the two struts 21 and 22. However, compared to when the deformation curbing member 20 has only one strut 21 or has only the two struts 21 and 22, the deformation curbing member 20 having the beam 23 according to the present embodiment can better curb change in relative positions between the two shrouds 12*i* and 12*o*, including an inclination, torsion, and the like of the other shroud 12*o* with respect to the one shroud 12*i*.

In the present embodiment, the struts 21 and 22 are welding-joined to the shrouds 12*i* and 12*o*, and the struts 21 and 22 are fixed to the shrouds 12*i* and 12*o*. However, the struts 21 and 22 may be fixed to the shrouds 12*i* and 12*o* using clamps or an adhesive. Similarly, the beam 23 may be fixed to the struts 21 and 22 using clamps or an adhesive. However, when the heat treatment step S4 is executed, it is preferable that the struts 21 and 22 be welding-joined to the shrouds 12*i* and 12*o* and the beam 23 be welding-joined to the struts 21 and 22.

In the present embodiment, the heat treatment step S4 is executed, but this heat treatment step S4 may not be executed. In this case, the deformation curbing member 20 may not be the same material as the base material of the turbine vane.

In addition, the present disclosure is not limited to each embodiment described above. Various kinds of addition, change, replacement, partial deletion, and the like can be made within a range not departing from the conceptual idea and the gist of the present invention derived from the contents defined in the claims and equivalents thereof.

APPENDIX

The turbine vane repairing method according to the embodiment and the modification example described above are ascertained as follows, for example.

(1) The turbine vane repairing method according to a first aspect is applied to the following turbine vane.

This turbine vane has the blade body 11 which has a cross section forming a blade profile and extends in the blade height direction Dh perpendicular to the cross section, the outer shroud 12*o* being provided at the end of the blade body 11 on the one side Dh1 in the blade height direction Dh, and the inner shroud 12*i* being provided at the end of the blade body 11 on the other side Dh2 in the blade height direction Dh.

In this repairing method for a turbine vane, the damaged spot removing step S1 of removing the damaged spot 15 of one shroud 12*i* of the outer shroud 12*o* and the inner shroud 12*i*, the member disposing step S2 of disposing the deformation curbing member 20 which comes into contact with the outer shroud 12*o* and the inner shroud 12*i* and curbs change in relative positions of the outer shroud 12*o* and the inner shroud 12*i*, the overlay welding step S3 of performing overlay welding with respect to the removed part 16 from which the damaged spot 15 is removed in the one shroud 12*i* and filling the removed part 16 after the damaged spot removing step S1 and the member disposing step S2, the member detaching step S5 of detaching the deformation curbing member 20 from the turbine vane after the overlay welding step S3, and the finishing step S6 of polishing at least the surface of a part subjected to the overlay welding in the one shroud 12*i* are executed.

In the present aspect, even when the one shroud 12*i* of the outer shroud 12*o* and the inner shroud 12*i* in the turbine vane is damaged, the damaged spot 15 of this one shroud 12*i* can be repaired.

When overlay welding is performed with respect to the removed part 16 from which the damaged spot 15 is removed, due to heat input to the one shroud 12*i*, for example, due to deformation of a connection part or the like between the one shroud 12*i* and the blade body 11, there is a possibility of change in relative positions of the two shrouds 12*i* and 12*o*. In the present aspect, since the deformation curbing member 20 is disposed before overlay welding, change in relative positions of the two shrouds 12*i* and 12*o* at the time of overlay welding can be curbed.

(2) According to the turbine vane repairing method of a second aspect, in the turbine vane repairing method according to the first aspect, the deformation curbing member 20 has the struts 21 and 22 having the first ends 21*a* and 22*a* and the second ends 21*b* and 22*b*. In the member disposing step S2, the first ends 21*a* and 22*a* of the struts 21 and 22 are fixed to parts excluding the damaged spot 15 in the one shroud 12*i*, and the second ends 21*b* and 22*b* of the struts 21 and 22 are fixed to the other shroud 12*o* of the outer shroud 12*o* and the inner shroud 12*i*.

In the present aspect, change in relative positions of the two shrouds 12*i* and 12*o* at the time of overlay welding can be curbed by the struts 21 and 22.

(3) According to the turbine vane repairing method of a third aspect, in the turbine vane repairing method according to the second aspect, the struts 21 and 22 have the first strut 21 having the first end 21*a* and the second end 21*b* and the second strut 22 having the first end 22*a* and the second end 22*b*. In the member disposing step S2, the first end 21*a* of the first strut 21 and the first end 22*a* of the second strut 22 are fixed to the one shroud 12*i* and the second end 21*b* of the first strut 21 and the second end 22*b* of the second strut 22 are fixed to the other shroud 12*o* such that the removed part 16 in the one shroud 12*i* is positioned between the first strut 21 and the second strut 22.

In the present aspect, change in relative positions of the two shrouds 12*i* and 12*o* at the time of overlay welding, particularly, an inclination or torsion of the other shroud 12*o* with respect to the one shroud 12*i* can be curbed by the two struts 21 and 22.

(4) According to the turbine vane repairing method of a fourth aspect, in the turbine vane repairing method according to the third aspect, the deformation curbing member 20 has the beam 23 having the first end 23*a* fixed to the first strut 21 and the second end 23*b* fixed to the second strut 22. In the member disposing step S2, the first strut 21 and the second strut 22 are coupled by the beam 23 by fixing the first end 23*a* of the beam 23 to the first strut 21 and fixing the second end 23*b* of the beam 23 to the second strut 22.

In the present aspect, since the two struts 21 and 22 are coupled to each other by the beam 23, an inclination or torsion of the other strut 22 with respect to the one strut 21 can be curbed. As a result, change in relative positions of the two shrouds 12*i* and 12*o* at the time of overlay welding, particularly, an inclination or torsion of the other shroud 12*o* with respect to the one shroud 12*i* can be curbed.

(5) According to the turbine vane repairing method of a fifth aspect, in the turbine vane repairing method according to the fourth aspect, in the member disposing step S2, the first end 23*a* of the beam 23 is welding-joined to the first strut 21 and the second end 23*b* of the beam 23 is welding-joined to the second strut 22.

(6) According to the turbine vane repairing method of a sixth aspect, in the turbine vane repairing method according to any one aspect of the second aspect to the fifth aspect, in the member disposing step S2, the first ends 21*a* and 22*a* of the struts 21 and 22 are welding-joined to the one shroud 12*i* and the second ends 21*b* and 22*b* of the struts 21 and 22 are welding-joined to the other shroud 12*o*.

(7) According to the turbine vane repairing method of a seventh aspect, in the turbine vane repairing method according to any one aspect of the first aspect to the sixth aspect, both the outer shroud 12*o* and the inner shroud 12*i* have the gas passing surface 13*g* facing a side where the blade body 11 is present in the blade height direction Dh and the counter gas passing surface 13*o* having a back-to-back relationship with the gas passing surface 13*g*. When the removed part 16 in the one shroud 12*i* penetrates the one shroud 12*i* from a part on the gas passing surface 13*g* of the one shroud 12*i* to a part on the counter gas passing surface 13*o* of the one shroud 12*i*, in the overlay welding step S3, overlay welding is performed with respect to the removed part 16 from a side of the counter gas passing surface 13*o* by bringing the patch plate 25 formed of copper or brass into contact with the gas passing surface 13*g* of the one shroud 12*i*.

In the present aspect, even when the removed part 16 in the one shroud 12*i* penetrates the one shroud 12*i*, overlay welding can be performed with respect to this removed part 16.

(8) According to the turbine vane repairing method of an eighth aspect, in the turbine vane repairing method according to any one aspect of the first aspect to the seventh aspect, the heat treatment step S4 of performing heat treatment for reducing welding residual stress occurring due to overlay welding is executed with respect to the turbine vane after the overlay welding step S3 and before the member detaching step S5.

In the present aspect, since the turbine vane after overlay welding is subjected to heat treatment, welding residual stress occurring due to overlay welding can be reduced.

(9) According to the turbine vane repairing method of a ninth aspect, in the turbine vane repairing method according to the eighth aspect, a material for forming the deformation curbing member 20 is the same material as the base material of the turbine vane.

In the heat treatment step S4, the turbine vane and the deformation curbing member 20 thermally expand. In the present aspect, since the base material of the turbine vane and the deformation curbing member 20 are formed of the same material, the amount of thermal expansion of the turbine vane and the amount of thermal expansion of the deformation curbing member 20 become the same. For this reason, in the present aspect, in the heat treatment step S4, occurrence of stress due to the deformation curbing member 20 fixed to the turbine vane can be curbed.

EXPLANATION OF REFERENCES

11 Blade body
12*i* Inner shroud
12*o* Outer shroud
13*g* Gas passing surface
13*o* Counter gas passing surface
15 Damaged spot
16 Removed part
17 Welding material
20 Deformation curbing member
21 First strut
22 Second strut
23 Beam
21*a*, 22*a*, 23*a* First end
21*b*, 22*b*, 23*b* Second end
25 Patch plate
Dh Blade height direction
Dh1 One side
Dh2 The other side

What is claimed is:

1. A turbine vane repairing method for repairing a damaged spot in a first shroud of an outer shroud and an inner shroud in a turbine vane having a blade body which has a cross section forming a blade profile and extends in a blade height direction perpendicular to the cross section, the outer shroud being provided at an end of the blade body on a first side in the blade height direction, and the inner shroud being provided at an end of the blade body on a second side in the blade height direction, the turbine vane repairing method comprising:

removing the damaged spot in the first shroud;

disposing a deformation curbing member which comes into contact with the outer shroud and the inner shroud and curbs change in relative positions of the outer shroud and the inner shroud;

performing overlay welding with respect to a removed part from which the damaged spot is removed in the first shroud and filling the removed part after the removing of the damaged spot and the disposing of the deformation curbing member;

detaching the deformation curbing member from the turbine vane after performing the overlay welding; and polishing at least a surface of a part subjected to the overlay welding in the first shroud.

2. The turbine vane repairing method according to claim 1, wherein the deformation curbing member has a strut having a first end and a second end, and wherein, during the disposing of the deformation curbing member, a first end of a strut is fixed to a part excluding the damaged spot in the first shroud, and a second end of the strut is fixed to a second shroud of the outer shroud and the inner shroud.

3. The turbine vane repairing method according to claim 2, wherein the strut is a first strut having the first end and the second end, and the turbine vane further comprises a second strut having a first end and a second end, and wherein, during the disposing of the deformation curbing member, the first end of the first strut and the first end of the second strut are fixed to the first shroud, and the second end of the first strut and the second end of the second strut are fixed to the second shroud such that the removed part in the first shroud is positioned between the first strut and the second strut.

4. The turbine vane repairing method according to claim 3, wherein the deformation curbing member comprises a beam having a first end fixed to the first strut and a second end fixed to the second strut, and wherein, during the disposing of the deformation curbing member, the first strut and the second strut are coupled by the beam by fixing the first end of the beam to the first strut and fixing the second end of the beam to the second strut.

5. The turbine vane repairing method according to claim 4, wherein, during the disposing of the deformation curbing member, the first end of the beam is welding-joined to the first strut and the second end of the beam is welding-joined to the second strut.

6. The turbine vane repairing method according to claim 2, wherein, during the disposing of the deformation curbing member, the first end of the strut is welding-joined to the first shroud and the second end of the strut is welding-joined to the second shroud.

7. The turbine vane repairing method according to claim 1, wherein both the outer shroud and the inner shroud have a gas passing surface facing a side where the blade body is present in the blade height direction and a counter gas passing surface having a back-to-back relationship with the gas passing surface, and wherein, when the removed part in the first shroud penetrates the first shroud from a part on the gas passing surface of the first shroud to a part on the counter gas passing surface of the first shroud, the overlay welding is performed with respect to the removed part from a side of the counter gas passing surface by bringing a patch plate formed of copper or brass into contact with the gas passing surface of the first shroud.

8. The turbine vane repairing method according to claim 1, further comprising performing heat treatment for reducing welding residual stress occurring due to overlay welding with respect to the turbine vane after the overlay welding step and before the detaching of the deformation curbing member from the turbine vane.

9. The turbine vane repairing method according to claim 8, wherein a material for forming the deformation curbing member is identical to a base material of the turbine vane.

* * * * *